United States Patent [19]

Leroux et al.

[11] Patent Number: 5,167,710
[45] Date of Patent: Dec. 1, 1992

[54] PROCESS FOR MANUFACTURING A CEMENT MIXTURE CONTAINING REINFORCING FIBERS AND PRODUCTS OBTAINED THEREFROM

[75] Inventors: Michel Leroux; Francois Toutlemonde, both of Paris; Jean-Luc Bernard, Clermont, all of France

[73] Assignee: Saint-Gobain Recherche, Aubervilliers, France

[21] Appl. No.: 578,907

[22] Filed: Sep. 6, 1990

[30] Foreign Application Priority Data

Jun. 9, 1989 [FR] France .................. 89 11666

[51] Int. Cl.$^5$ ...................... C04B 14/38; C04B 14/02
[52] U.S. Cl. .................... 106/711; 106/684; 106/688; 106/691; 106/694; 106/698; 106/716; 106/718; 106/724; 106/738; 106/773; 106/790; 106/801; 106/803; 106/814; 106/816; 106/817; 106/819; 106/823
[58] Field of Search ............ 106/711, 684, 688, 691, 106/694, 698, 716, 718, 724, 738, 773, 790, 801, 803, 814, 816, 817, 819, 823

[56] References Cited

U.S. PATENT DOCUMENTS

| | | | |
|---|---|---|---|
| 3,616,173 | 10/1971 | Green | 106/711 |
| 4,132,555 | 1/1979 | Barrable | 106/711 |
| 4,229,225 | 10/1980 | Kraszewski et al. | 106/711 |
| 4,261,757 | 4/1981 | Mathieu | 106/711 |
| 4,272,388 | 6/1981 | Wermelin | 106/711 |
| 4,293,343 | 10/1981 | Shannon | 106/711 |
| 4,363,666 | 12/1982 | Johnson et al. | 106/711 |
| 4,377,415 | 3/1983 | Johnson et al. | 106/711 |
| 4,588,443 | 5/1986 | Bache | 106/711 |
| 4,793,861 | 12/1988 | Sohm | 106/711 |
| 4,803,107 | 2/1989 | Knowles | 106/711 |
| 4,981,521 | 1/1991 | Bettacchi et al. | 106/711 |

Primary Examiner—William R. Dixon, Jr.
Assistant Examiner—Anthony J. Green
Attorney, Agent, or Firm—Pennie & Edmonds

[57] ABSTRACT

Process for making a cement mixture containing fibers wherein a paste is formed by mixing cement and, per 100 parts by weight of cement, approximately 5 to 20 parts by weight of a first pulverized material of which the grains have an average diameter of between 1/5 and 1/10 of the average diameter of the grains of the cement and approximately 20 to 35 parts by weight of water. The paste is then mixed with reinforcing fibers. The paste may also include a second pulverized material the average grain diameter of which is between 1/5 and 1/10 of the average diameter of the first pulverized material. The invention further includes products made from a cement mixture manufactured according to one of the foregoing processes.

35 Claims, No Drawings

PROCESS FOR MANUFACTURING A CEMENT MIXTURE CONTAINING REINFORCING FIBERS AND PRODUCTS OBTAINED THEREFROM

FIELD OF THE INVENTION

The present invention relates to a process for manufacturing a cement base mixture containing reinforcing fibers and the products obtained from this mixture.

A particularly important application for the invention, although not exclusive, is in the area of fibro-cement materials which are used in the construction industry for manufacturing roofing components, plates, facade panels and base reliefs, etc.

BACKGROUND OF THE INVENTION

The reinforcing of cement with different types of fibers is well known. The advantages obtained by stengthening a mineral material in order to confer ductility and greater tensile resistance thereon has been long known, as is evident from the ancient existence of daub or reinforced concrete.

Similarly, attempts have been made from quite early on to reinforce cement with fibers. The industrial use of asbestos fibers as a reinforcement, for example, dates from the beginning of the twentieth century.

However, and particularly since the discovery in the 1960's of the increased risks of cancer due to touching and inhaling asbestos fibers, other types of fibers for reinforcing cement.have also been utilized. In this respect, steel fibers, cast iron fibers, glass fibers, cellulose fibers, polypropylene fibers and other synthetic fibers, natural jute and bambou fibers, etc. have been used. However, the use of fibers of these types has not developed satisfactorily, because such cement fiber mixtures are difficult to manufacture.

On this account, the known processes of the prior art which employed means of filtration, impregnation, projection, or mixing the fibers with cement when the cement is mixed (a process known as PREMIX) each has disadvantages which limit the use thereof. For example, the process of manufacturing the cement-fiber mixture by filtering the cement through fibers is not suitable for all types of fibers. These fibers must be quite thin in order to form an efficient filter and have a sufficient affinity with water, which excludes, in particular, the use of glass fibers. Furthermore, the need to press the manufactured parts excludes the production of high relief parts. Moreover, a circuit for supplying and eliminating the water used at the filtering stage is necessary, a step which involves high expenditure.

The process for manufacturing the cement fiber mixture by means of impregnation is time consuming and difficult to carry out, therefore it is expensive.

The manufacture of a mixture of cement and fibers by spraying the cement and fibers onto a mold or a wall is not suitable for all types of fibers, as with the manufacturing process by means of filtration. The fibers must have properties of size and appearance which enable them to be sprayed, and thus requires expensive fibers which must be manufactured in a particular way.

The spraying of the cement paste requires that large quantities of water are used, hence there are aging problems associated with the product obtained by this process, i.e., the properties deteriorate over time. Furthermore, because the projection method is complicated to carry out, it requires a trained and qualified operator.

Finally, the prior art process of mixing the fibers with the cement when the cement is mixed (a process known as PREMIX), considerably limits the proportion of fibers that can be mixed with the cement paste. The increase in the viscosity of the mixture due to the addition of fibers must generally be compensated for by initially using a larger amount of water. Therefore, PREMIX results in a product which exhibits inferior performance over time, similar to the disadvantage of the manufacturing process by spraying. Also, as with the manufacturing process by means of spraying, the labor force carrying out the PREMIX process must be trained and qualified, which renders the methods known as the PREMIX type expensive and essentially limited to small scale production.

SUMMARY OF THE INVENTION

The present invention provides a method for manufacturing a cement base mixture strengthened with reinforcing fibers and products obtained from this mixture which meet the practical demands more fully than the prior art, particularly in that all types of reinforcing fibers may be used. The products formed according to the present invention are very compact and perform well over time, i.e., exhibit favorable properties after aging, and in particular have a good bending strength. Further, the present method is simple to put into operation, enables a simple casting of the resulting mixture, and thus may be utilized at an acceptable cost.

The invention comprises the discovery that the fiber and cement mixture is greatly improved when a compact paste is formed by mixing the cement with, per 100 parts by weight of cement, approximately 5 parts to approximately 20 parts by weight of a first charge of pulverized material, the average grain diameter of which is between 1/5 and 1/10 of the average diameter of the cement grains, and with approximately 20 parts to approximately 35 parts by weight of water, then at least one sort of reinforcing fibers is mixed with the paste thus obtained.

The method of the present invention differs from the prior art processes of the PREMIX type in two essential ways: 1) in the order of the stages which are carried out, i.e., the invention follows the following order: mixing of powders and cement mixing, then the addition of the fibers; and 2) in the small proportion of water used compared to the conventional proportions known.

The invention also comprises a process for manufacturing a cement base mixture containing reinforcing fibers characterized in that a paste is formed by mixing the cement and, per 100 parts by weight of cement, approximately 5 parts to approximately 20 parts by weight of a first pulverized material, the average grain diameter of which is between 1/5 and 1/10 of the average diameter of the grains of the said cement, from approximately 20 parts to approximately 35 parts by weight of water and at least one additive (a liquifier, a water reducer or a dispersant) then mixing the paste with at least one sort of reinforcing fibers.

The present invention further comprises mixing, prior to the addition of water, up to approximately 5 parts, per 100 parts by weight of cement, of a second pulverized material, the average grain diameter of which is between 1/5 and 1/10 of the average grain diameter of the first pulverized material.

DETAILED DESCRIPTION OF THE PREFERRED EMBODIMENT

In advantageous embodiments of the invention, the mixture is made according to one and/or the other of the following ways:

the paste is formed with, per 100 parts by weight of cement, between 23 parts and 30 parts by weight of water, per 100 parts by weight of cement, approximately 2 parts to approximately 18 parts by weight of reinforcing fibers is mixed with the paste, moreover, the paste is formed by mixing with the cement and the first pulverized material, per 100 parts by weight of cement, up to approximately 5 parts by weight of a second pulverized material, the average grain diameter of which is between 1/5 and 1/10 of the average diameter of the grains of the first pulverent material, the paste is formed by adding, per 100 parts by weight of cement, up to approximately 4 parts by weight of a rheological additive and advantageously between 2 and 3 parts, the paste is formed by adding, per 100 parts by weight of cement, up to approximately 1 part by weight of plasticizer, the paste is formed by mixing the different dry materials then by mixing the homogenous mixture obtained, the first pulverized material comprises grains of an average diameter of between 3 $\mu$m and 20 $\mu$m, the reinforcing fibers have an average diameter of between approximately 3 and 30 $\mu$m.

One of the advantages of the invention is the ability of simultaneously introducing several types of fibers. It is thus possible to add to the mixture mineral fibers or glass fibers the average diameter of which is between approximately 10 and 30 $\mu$m and preferably equal to approximately 20 $\mu$m, and fibers of the same type the average diameter of which is less than approximately 5 $\mu$m. The first fibers improve the mechanical properties of the composite (elasticity, traction, impact), whereas the second fibers improve impermeability, resistance to microcracking and abrasion.

The invention also comprises a product with a cement base strengthened with reinforcing fiber which is obtained from a mixture made according to one of the processes described hereabove, characterized in that the production comprises, per 100 parts by weight of cement, approximately 5 parts to approximately 20 parts by weight of a first pulverized material the average grain diameter of which is between 1/5 and 1/10 of the average diameter of the grains of cement. Advantageously, the product moreover comprises, per 100 parts by weight of cement, up to approximately 5 parts by weight of a second pulverized material of which the grains have an average diameter of between 1/5 and 1/10 of the average diameter of the grains of the first pulverized material.

In one advantageous embodiment, the first pulverized material is metakaolin, with an average diameter of between 3 $\mu$m and 20 $\mu$m, the second pulverized material is micro silica, and the reinforcing fibers comprise glass wool.

The invention can be better understood by reading the following explanations and the enclosed tables. First of all, the inventors utilized test results for optimizing the proportions between grain sizes of the concrete constituents in order to enable the compactness of the concrete to be improved. The constituents are added here in a new way to the cement paste of which the size of the largest granulate constituent is that of the largest grain of cement.

It is known that the more compact the product, the more satisfactory the properties thereof of physical and mechanical strength over time.

The interstitial spaces defined by the grains of a product determine the compactness (or porosity) thereof. By mixing an initial powder formed with grains of an average given diameter with a charge o pulverized product, the average grain diameter of which is smaller, certain interstitial spaces are filled in, which renders the final product obtained more compact.

It is this principle which has been used by the inventors who realized in an empirical manner that, in the particular case of cement, the optimum proportions to be obtained between the average diameter of the grains of the said cement and that of the charge of a first pulverized material were approximately 1/5 to approximately 1/10 with respect to one another, and that the addition of a further charge of a second pulverized material, in proportions of average diameters between pulverent products identical to those between cement and a first pulverent material, further improves the compactness.

Furthermore, the inventors also realized, unexpectedly, that maintaining the aforementioned proportions between average diameters greatly facilitates the mixing with the reinforcing fibers, which is one of the essential features of the invention.

By way of a non-limiting example of the results obtained by the inventors in order to come to these proportions, a table of porosity measures (Table I) is given hereafter for two typical cement paste compositions which are made respecting the proportions between diameters of the invention: composition no. 1 without a "second" pulverized material, and composition no. 2 with a "second" pulverized material (in this case microsilica).

Other test measurements utilizing different grain size values which are still within the limits of the ranges given by the present invention have enabled the inventors to confirm the beneficial nature of the recited ranges.

After 25 cycles of immersing/drying the products obtained from the compositions no. 1 and no. 2, porosities were obtained (measured by a helium pycnometer) which are close to theoretical optimum porosity.

The properties of the materials used for these compositions are:

cement: CPA 55; average diameter of the grains of the order of 60 $\mu$m, first pulverized material: metakaolin; average diameter of 10 $\mu$m, second pulverized material: miorosilica; average diameter of 1 $\mu$m, an additive used as a water reducer: sulphonate polynaphthalene (known under the name LOMAR.D.).

TABLE I

| Composition 1 | CPA | MK | | water + lomar | Glass fibers |
|---|---|---|---|---|---|
| weight in g | 400 | 40 | | 120 + 10 | 36 |
| final porosity = 7.15% | | | | | |
| Composition 2 | CPA | MK | $\mu$Si | water + lomar | Glass fibers |
| weight in g | 400 | 40 | 10 | 100 + 10 | 36 |
| final porosity = 5.79% | | | | | |

Table II below gives the average theoretical maximum values for sphere packing of grain size classes of the same type as the compositions no. 1 and 2 above.

TABLE II

| Theoretical Constituent in % final porosity = 4.29% | CPA 65 | MK 15.15 | μSi 7.96 | void 4.29 | Glass fibers 7.58 |
|---|---|---|---|---|---|

It is noted that the theorecitcal value is close to the values obtained with composition no. 1 and that they are even improved with composition no. 2. The compactness obtained for the products of the invention is therefore optimized.

Table III gives the composition of different mixtures with a cement base and reinforcing fibers. The values indicate the weights in grams. The mixtures of Table III were used to make products which were subjected to tests, the results of which are shown in Table IV. Certain products were made with the mixtures according to the invention and others were not, so as to enable comparisons to be made with the results obtained.

The different mixtures shown in Table III were made with cement CPA 55. However, all other types of cement are possible. In particular, a pozzolanic-sulphate cement of Japanese origin marketed under the name CHICHIBU, or special cements, for example an aluminous cement manufactured by the HEIDELBERGER ZEMENT company (FRG), may of course be used. See for this purpose the enclosed Tables III BIS and IV BIS.

In Table III, the "first" pulverized material is metakaolin with an average grain size diameter of the order of 5 μm, having a BET specific surface of 15 to 30 m$^2$/g and Chapelle Test (BS standard 6432 of 1984) results showing a metakaolin consumption of the order of 610 mg of CaO/g. Metakaolin is the thermally activated product of kaolinite. The abbreviated formula for metakaolin may be written, using the standard symbols used by concrete workers, as: $AS_2$, wherein $A=Al_2O_3$ and $S=SiO_2$. It is obtained by thermally treating the kaolinite at temperatures ranging from between 700° and 900° C. over periods of a few hours.

Naturally, other "first" pulverized materials which satisfy the grain size proportions of the invention with respect to the cement may be used.

In particular, chalks, kaolins, clays, dolomites, hollow mineral microspheres (average diameter of the order of 30 μm) or even Wollastonite powder (average diameter of the order of 8 to 10 μm) may be used, without the list being limitative.

The "second" pulverized product used in Table III is formed from microsilica with a specific surface of 20 m$^2$/mg and an average diameter of between 0.3 and 3 μm. Here again other products may be used according to invention, as for example graphite with suitable grain size or microfibers of crushed glass the average diameter of which is equal to or less than approximately 3 μm.

Once again it must be noted that it is particularly the physical effects observed on the mixture and the products which result therefrom, which effects are due, inter alia, to the grain size ratios of the pulverized materials with respect to one another and with the cement, that are important for obtaining good results and which enable the mixture to be manufactured and put into operation in a simple manner with the reinforcing fibers according to the invention, more so than the chemical effects, for example pozzolanic effects, smalls/fines and ultra fines/smalls used as first and second pulverized materials.

The additive used in the mixtures mentioned in Table III is polynaphthalene sulphonate known under the name LOMAR.D. and of which the average diameter is of the order of 50 μm. Other additives known to the person skilled in the art may also be used.

The plasticizer of the mixtures in Table III, which is not mentioned in a limiting manner, is carboxymethylcellulose (CMC) of the type known under the name BLANOSE (reference AKUCELL MS 710) with an average diameter of the order of 40 μm.

Finally, a plurality of types of glass fibers appear in the mixtures in Table III, without it limiting the type of fibers to be used. The fibers used are designated by the letters which signify the following: the fibers $Z_1$ and $Z_2$ are obtained according to a drawing process by means of fluid and correspond to alkali-resistant glasses containing zirconium oxide. The fiber $Z_3$ is a continuous fiber which corresponds to a composition of the same type obtained by means of mechanical drawing. The fibers $A_1$ and $A_2$ are manufactured from a alumino-magnesium glass, which also resists corrosion by an alkaline medium, according to a process using drawing by means of fluid; the first is in rough manufactured state, the second has undergone carding before being used. The fibers $B_1$ and $B_2$ are obtained from a slag and basalt based glass, according to two different processes using drawing by means of fluid. The number following the fiber references indicates that average diameter of the fibers (or filaments) expressed in μm.

The meanings of the notations used in the present application and in particular in Table IV (notations moreover which are completely standard) are given hereafter:

MOR or $\sigma_r$ (in MPA) is the maximum pulling stress in a bending test known as 3 point bending, at the moment of breaking. The breaking is defined for all the materials studied as the maximum of the stress/deformation curve, although a maximum of this type does not always coincide with a dramatic fall in the stress to which the material is subjected.

$\Sigma r$ (in %) is the elongation at breaking. The elongation is calculated by the formula: $\Sigma = 6 f/l^2$ where f is the sag or deflection at the center and l the distance between supports.

LOP (in MPa) expresses the limit of linearity. It is the pont where the stress/deformation curve becomes non linear.

$\Sigma_{Lop}$ or $\Sigma_e$ (in %) is the elongation at the limit point of linearity.

d is the density (humid).

E (in GPa) is Young's Modulus or the modulus of elasticity.

$W_r$ (in J/m$^2$) is the energy at break.

$W_e$ (in J/m$^2$) is the energy necessary to reach the limit point of elasticity for the product tested.

"a.a." is the abbreviation for accelerated aging. The test used most often si a 28 day immersion in water at 50° C. The term "over time" is often used for samples after "a.a.".

$I_t$ is the index of tenacity. It is the ratio of energy at break to bending energy stored up to the limit of proportionality. This index, although subject to strong variations, characterizes the performance of the material A study of Tables III and IV shows that a cement containing pulverized materials in the proportions of the invention has satisfactory physical properties: modulus of rupture (MOR), elongation at rupture ($\Sigma r$), resistance to traction, etc.

In praticular, the inventors were able to note that excellent results are obtained with a paste where the metakaolin represents only 10% of the weight of the cement, whilst a stoichiometry of 30% of metakaolin in relation to the cement weight, a priori more faborable for chemical-reasons, had to be abandoned for reasons of grain size rendering the introduction of the fibers in the paste difficult. The 30% metakaolin cement exhibits a more favorable wetting stage, but at the same time is harmful for the performance over time of the product which results from the mixture.

The numerous tests which the inventors carried out and of which the Tables III and IV give examples confirmed these results.

Another important parameter of the invention relates to the amount of water to be added to the paste in order to obtain the compact mixture of the invention and to enable the reinforcing fibers to be mixed therewith without much effort and in a relatively rapid manner. If the mixture is stirred too vigorously or for too long the reinforcing fibers are in effect damaged.

It is to be noted that the chemistry of the paste as well as that of the fibers, despite everything, plays an important role according to whether or not the wetting stage is encouraged. For example, a very slow setting is oberved with the glass $Z_2$, but on the other hand a quite rapid setting is observed with $B_1$ and $B_2$ which requires less water, even for a large proportion of fibers.

From Tables III and IV the general properties of the invention can be deduced, knowing that an optimization of the proportions between constituents, whilst remaining within the ranges of the invention, may be advantageously sought for each type of fiber and each more specific chemical property of the paste used. It is observed generally that:

the density, Young's modulus, and the stress limits are functions which decrease with the proportion of water;

the elongation limits and the index of tenacity are functions which increase with the proportion of water, however only from a water/cement (W/C) threshold close to 0.4.

In more closely observing groups of compositions where only the proportion of water is modified, it is noted that:

for one composition in powder form (cement+pulverized materials), the density and Young's modulus undergo, according to the proportion of water, a strong decline, to a level corresponding to an excess of water;

the elongation is a function which increases from W/C threshold of 0.4;

the breaking energy and stress have maxima corresponding to a compromise between a positive water effect (which can be seen in particular for pastes with a large amount of smalls, or pulverized materials, which are therefore relatively dry) and a more or less accentuated decreasing effect.

In order to measure the proportion of water it should be noted that:

in order to fill the voids between pulverized materials and cement the amount of water necessary is of the order of 15% of the total volume (cement+fibers−pulverized materials), i.e., of the order of 15 g per 100 g of cement;

each addition of water is going to break, at least temporarily, the compact arrangement of the paste as long as it is not applied solely for wetting grains and fibers;

in order to obtain correct working ability, taking into account a "reasonable" amount of additives, it is difficult to go below a ratio in weight between the water and the cement W/C equal to the order of 0.2 to 0.25;

finally in order to enable the cement to set well, and although it only involves one average in the reactions to the varied stoichiometries, it is necessary to add on the order of 25 g of water per 100 g of cement. With an amount of this type setting conditions similar to those in the form of "single gel" precipitation practically without crystallization are reached which encourages the mechanical properties and a good interface quality between the cement and the fibers.

The advantage in limiting the amount of water is not only to enable the fibers to be introduced without a segregation effect and to limit the shrinkage and different deformations (plastic flow) but also, owing to the qualities of compactness of the paste and the good interface achieved between cement and reinforcing fibers, to permit good physical properties and good resistance to breaking over time to be achieved.

The disadvantages of a small amount of water (essentially a relatively slow setting and therefor a rather delicate curing) can be minimized or eliminated by optimizing the amount of liquifjer.

In referring to the tables, and having carried out the standard test of accelerated aging, an improvement in the mechanical properties can be observed owing to the addition of the additive.

In short, the amounts of water and additive were optimized by the inventors based on numerous observations which they made in the following manner: per 100 parts by weight of cement approximately 20 parts to approximately 35 parts by weight of water and up to 4 parts by weight of additives and advantageously between 2 and 3 parts, according to the type of fibers and the composition of the paste.

Tables III and IV also show the optimum proportions, by weight in relation to the weight of the cement, of fibers to be used in the mixtures of the invention. Out of all the samples manufactured by the inventors and of which the tables have values given by way of non-limiting examples, they were able to show a few relatively clear effects connected with the quantity of the fibers.

In effect, an increase in the limit of linearity, stress limits, breaking elongation and energy are observed for fiber contents between approximately 2 parts to approximately 18 parts by weight of fibers per 100 parts by weight of cement. Furthermore, although all types of mineral fibers may be used, it is observed that excellent results are obtained when the reinforcement is in the form of interlocking glass or basalt fibers.

Tables no. III BIS and IV BIS show briefly that advantageous results are also obtained with types of cement other than CPA 55.

In addition, it is observed that the different ratios between cement weight and quantity of water used lead to the following breaking stresses:

$\sigma_r$ 25 to 30 MPa for a water to cement ratio of the order of 0.245;

$\sigma_r$ 20 to 22 MPa for a water to cement ratio of the order of 0.3.

On the other hand, the breaking elongation is:

$\Sigma_r$ 1 to 1.1 for CPJ reinforced with basalt (strong adherence), $\Sigma_r$ 2 for CPA with a quantity of water of approximately 0.3 (less stronger adherence), $\Sigma_r$ 1 to 1.2 for CPA with a smaller quantity of water (it is therefore too dry and therefore too adherent), $\Sigma_r$ is correct for white cement, provided that W/C<0.25 (if not smalls must be added).

The crucial feature of the amount of water which appears here was also verified on different samples by a study performed with a scanning electron microscope.

An embodiment of the process of the mixture according to the invention will now be described hereafter.

To a dry composition containing the cement in a premixed state, a first charge and if necessary a second charge of pulverized materials, according to the quantities of the invention, an operator adds a quantity of water corresponding to a predetermined value within the ranges indicated by the invention (the powder may also be advantageously mixed by the operator, just before the mixing stage). Additives (liquifiers, plasticizers, etc.) are also advantageously introduced by the operator before, whilst or after the water is added. The additives chosen depend on the type of cement, the type of pulverized materials and the type of reinforcing fibers used.

The mixtures are made using standard mixers without it being necessary to mix the paste before the fibers are introduced. The following types of mixers in particular may also be used: planetary movement mixer, for example of the type known under the names HOBART, PERIER, KENWOOD, "OMNIMIXEUR" mixer (COLLOMATIC), waltz train mixer (mixer developed by HEINRICH), ploughshare mixer etc.

Once the paste is obtained, the reinforcing fibers are added. These reinforcing fibers may be of any known type, in particular crushed or non-crushed glass fibers being in the form for example of a bundle of parallel embodiment of the invention described in more detail hereabove, or polymer fibers or any type such as those mentioned in the introduction of the present application (steel, cast-iron etc.).

The "small" quantity of water added gives the paste obtained a singularly "dry" appearance. Nevertheless, the use of particles of stepped grain size and of liquifiers gives the paste a marked thixotropic character which makes it possible to add the fibers in a simple manner.

The fibers are added to the paste, and the paste and fibers are mixed for a sufficient amount of time in order to obtain a good homogeneity. The total time for these different steps varies from the order of 30 seconds to the order of 20 minutes according to the type of mixer used.

The mixture is then used for making a product, for example a tile.

Since the mixture obtained is easy to work, it may in particular and advantageously be used for casting.

In this case, it is introduced in the casts and shaped for example by vibration for, for example, the order of 5 to 15 minutes.

The type of composition used and the mixing method according to the embodiment of the invention described here in more detail are based on an indisputable improvement in the physical properties of the products manufactured with the cement reinforced with fibers, particularly glass fibers. Notably:

the rheology of the paste obtained after the fibers have been added (for example glass wool or rock wool) is characterized by a strong static viscosity and a thixotropy enabling it to be worked well under vibration, which makes different shapings possible, for example by pumping, casting under vibration, pressing, moulding, possibly centrifuging or extrusion;

for products of which the reinforcement is formed by glass wool or rock wool, very low porosity (up to 5% and less) and excellent static mechanical properties (high elastic limits) are observed.

By way of example, and as is seen from Tables III and IV, for a cement/metakaolin/glass wool compound with a density of 2 to 2.2, the maximum traction stress at breaking reaches 30 to 40 MPa in 3 point bending.

The process also enables the properties of the materials reinforced with textile fibers, known as "GRC" in a PREMIX manner, to be improved.

Also observed, besides a low porosity, exceptional static and dynamic properties, are resistance to impact, nailability, modulus of rupture reaching 50 to 60 MPa for an elongation of approximately 1%.

For all the products manufactured by the process of the invention, with fibers of a sufficient diameter, a notable performance without deterioration is observed after accelerated aging (immersion in hot water at 50° C., then immersion/drying and impact) and regardless of the chemical composition of the glass fibers or other fibers used. This is due to the excellent compactness and the small amount of water of the cement matrix of the mixture. The relatively large diameter of the fibers used also plays a role.

It was also observed in particular that certain glass fibers, reputed not to resist alkalines or cement for a long time, did not decompose when the composites made by this process aged. The process is thus relieved of stresses connected with the pozzlanic nature of the charges introduced, with the resistance of glass to alkalines or with the need to provide polymer additives.

TABLE III

| no | cement | water | liquifier | MK | μ Si | plasticizer | Fibers type | weight |
|---|---|---|---|---|---|---|---|---|
| 1 | 100 | 60 | 2.5 | 30 | — | 0.5 | $Z_1,23$ | 9 |
| 2 | 100 | 50 | 2.5 | 10 | 10 | 0.5 | $Z_1,23$ | 9 |
| 3 | 100 | 50 | 2.5 | 30 | — | — | $Z_1,23$ | 9 |
| 4 | 100 | 45 | 2.5 | 10 | — | 0.5 | $Z_1,23$ | 8.5 |
| 5 | 100 | 42.5 | 2.5 | 30 | — | — | $Z_1,23$ | 14 |
| 6 | 100 | 40 | 2.5 | 10 | 10 | — | $Z_1,23$ | 9 |
| 7 | 100 | 40 | 2.5 | 30 | — | — | $Z_1,23$ | 9 |
| 8 | 100 | 40 | 2.5 | 5 | 5 | — | $Z_1,23$ | 10 |
| 9 | 100 | 35 | 2.5 | 10 | 2.5 | — | $Z_1,23$ | 5.25 |
| 10 | 100 | 35 | 2.5 | 10 | 2.5 | 0.5 | $Z_1$ | 5.25 |
| 11 | 100 | 35 | 2.5 | 10 | 2.5 | — | $Z_1$ | 17.5 |
| 12 | 100 | 30 | 2.5 | 10 | 10 | — | $Z_1,23$ | 9 |
| 13 | 100 | 28.25 | 2.5 | 10 | — | — | $Z_1,40$ | 15 |
| 14 | 100 | 28.25 | 2.5 | 10 | 2.5 | — | $Z_1$ | 5.25 |
| 15 | 100 | 28.25 | 2.5 | 10 | — | — | $Z_1$ | 10 |
| 16 | 100 | 25 | 2.5 | 10 | — | — | $Z_1,40$ | 9 |
| 17 | 100 | 25 | 2.5 | 10 | — | — | $Z_1,40$ | 10 |
| 18 | 100 | 25 | 2.5 | 10 | — | — | $Z_1,23$ +40 | 7.5 +2.5 |
| 19 | 100 | 25 | 2.5 | 10 | — | — | $Z_1,23$ +40 | 5 +5 |
| 20 | 100 | 25 | 2.5 | 10 | 2.5 | — | $Z_1,23$ | 10 |
| 21 | 100 | 25 | 2.5 | 10 | 5 | — | $Z_1,23$ | 10 |
| 22 | 100 | 21.25 | 2.5 | 10 | — | — | $Z_1$ | 9 |
| 23 | 100 | 40 | 2.5 | 30 | — | — | $A_1$ | 9 |
| 24 | 100 | 40 | 2.5 | 10 | — | 1 | $A_1$ | 7.25 |
| 25 | 100 | 35 | 3 | 10 | — | — | $A_1$ | 10 |
| 26 | 100 | 30 | 2.5 | 10 | — | — | $Z_1$ | 9 |
| 27 | 100 | 30 | 2.5 | 10 | — | — | $A_2$ | 9 |
| 28 | 100 | 30 | 2.5 | 10 | — | — | $A_2$ | 15 |
| 29 | 100 | 30 | 4.5 | 10 | — | — | $A_2$ | 16 |
| 30 | 100 | 30 | 2.5 | 10 | — | — | — | 0 |
| 31 | 100 | 27.5 | 2 | 10 | — | — | $A_2$ | 11 |
| 32 | 100 | 27.5 | 2.5 | 10 | — | — | $A_2$ | 10 |
| 33 | 100 | 30 | 2.5 | 10 | 2.5 | — | $A_2$ | 10 |
| 34 | 100 | 27.5 | 2.5 | 10 | 5 | — | $A_2$ | 10 |
| 35 | 100 | 26.8 | 1.9 | 10 | — | — | $A_2$ | 8 |

TABLE III-continued

| no | cement | water | liqui-fier | MK | μ Si | plasti-cizer | Fibers type | Fibers weight |
|---|---|---|---|---|---|---|---|---|
| 36 | 100 | 25 | 4.5 | 10 | — | — | $A_2$ | 11 |
| 27 | 100 | 25 | 2 | 10 | — | — | $A_1$ | 11 |
| 38 | 100 | 25 | 2.5 | 10 | — | — | $A_1$ | 15 |
| 39 | 100 | 25 | 2.5 | 10 | — | — | — | 0 |
| 40 | 100 | 25 | 2.5 | 10 | — | — | $A_2$ | 5 |
| 41 | 100 | 25 | 2.5 | 10 | — | — | $A_2$ | 11 |
| 42 | 100 | 25 | 2.5 | 10 | — | — | $A_2$ | 15 |
| 43 | 100 | 25 | 2.5 | 10 | — | — | $A_2$ | 7.25 |
| 44 | 100 | 30 | 2.5 | 10 | — | — | $Z_2$ | 9 |
| 45 | 100 | 30 | 2.5 | 10 | — | — | $Z_2$ | 11 |
| 46 | 100 | 30 | 2.5 | 10 | — | — | $Z_2$ | 15 |
| 47 | 100 | 27.5 | 2.5 | 10 | — | — | $Z_3$ | 9 |
| 48 | 100 | 24.5 | 2.5 | 10 | — | — | $Z_3$ | 9 |
| 49 | 100 | 30 | 2.5 | 10 | — | — |  | 9 |
| 50 | 100 | 30 | 2.5 | 10 |  |  |  | 16 |
| 51 | 100 | 27.5 | 2 | 10 |  |  |  | 15 |
| 52 | 100 | 25 | 1.5 | 10 |  |  |  | 11 |
| 53 | 100 | 24.5 | 2.5 | 10 |  |  |  | 9 |
| 54 | 100 | 24.5 | 2.5 | 10 |  |  |  | 9 |
| 55 | 100 | 24.5 | 2.5 | 10 |  |  |  | 9 |
| 56 | 100 | 24.5 | 2.5 | 10 |  |  |  | 9 |
| 57 | 100 | 24.5 | 2.5 | 10 |  |  |  | 9 |

TABLE III BIS

| no | Type cement | Quantity cement | water | liqui-fier | MK | Type of fibers | Weight of fibers |
|---|---|---|---|---|---|---|---|
| 58 | $1_{(CPA)}$ | 100 | 24.5 | 2.5 | 10 | Bas TOR | 9 |
| 59 | $2_{(HP)}$ | 100 | 24.5 | 2.5 | 10 | Bas TOR | 9 |
| 60 | $3_{(CPJ)}$ | 100 | 24.5 | 2.5 | 10 | Bas TOR | 9 |
| 61 | $4_{white}$ | 100 | 24.5 | 2.5 | 10 | Bas TOR | 9 |
| 62 | 3 | 100 | 30 | 2.5 | 10 | Bas TOR | 9 |
| 63 | 4 | 100 | 30 | 2.5 | 10 | Bas TOR | 9 |

TABLE IV

| MIXTURE | 1 | 2 | 3 | 4 | 5 | 6 | 7 | 8 | 9 | 10 | 11 | 12 |
|---|---|---|---|---|---|---|---|---|---|---|---|---|
| MOR | 14.13 | 11.15 | 16.6 | 19.14 | 34.67 | 13.03 | 17.38 | 20.92 | 19.32 | 17.92 | 25.63 | 23.9 |
| $\Sigma_r$ | 4.47 | 2.33 | 2.87 | 2.08 | 2.40 | 2.53 | 2.3 | 2.32 | 0.96 | 1.23 | 1.74 | 3.03 |
| LOP | 9.38 | 10.6 | 13.85 | 16.98 | 33.3 | 9.86 | 15.2 | 13.72 | 19.25 | 19.25 | 19.51 | 18.71 |
| $\Sigma_{LOP}$ | 1.95 | 1.61 | 1.59 | 0.79 | 2.27 | 1.81 | 1.64 | 1.23 | 0.94 | 0.78 | 1.06 | 1.59 |
| d | 1.59 | 1.61 | 1.74 | 1.67 | — | 1.71 | 1.85 | 2.04 | 2.13 | 2.12 | 1.93 | 1.98 |
| E | 5.04 | 6.39 | 8.06 | 9.90 | 12.82 | 8.64 | 8.8 | 11.39 | 20.20 | 20.73 | 18.63 | 12.31 |
| $W_r$ | 311 | 140 | 231 | 164 | 320 | 172 | 181 | 229 | 75 | 110 | 208 | 376 |
| $W_e$ | 72 | 71 | 87 | 117 | 294 | 44 | 103 | 68 | 73 | 48 | 81 | 116 |
| $MOR_{a.a}$ | 13.69 | 14.49 | 19.24 | 14.92 | — | 18.79 | 20.44 | 16.50 | 16.83 | 19.61 | 29.22 | 23.49 |
| $\Sigma_{r\,a.a}$ | 3.27 | 4 | 2.57 | 1.57 | — | 2.07 | 2.35 | 1.96 | 0.79 | 1.34 | 2.11 | 1.72 |
| $LOP_{a.a}$ | 10.93 | 12.57 | 17.89 | 14.5 | — | 17.22 | 17.28 | 14.30 | 16.50 | 17.08 | 19.72 | 22.53 |
| $\Sigma_{LOP\,a.a}$ | 2.1 | 2.73 | 1.87 | 1.5 | — | 1.57 | 1.81 | 1.60 | 0.77 | 0.9 | 1.11 | 1.36 |
| $d_{a.a}$ | 1.89 | 1.95 | 1.89 | 1.92 | — | 1.75 | 1.89 | 1.87 | 2.13 | 2.95 | — | 2.03 |
| $E_{a.a}$ | 5.22 | 4.22 | 9.11 | 10.73 | — | 10.86 | 9.67 | 9.28 | 21.54 | 20 | 18.14 | 15.93 |
| $I_t$ | 4.55 | 1.79 | 2.73 | 1.85 | 1.2 | 4.36 | 2.03 | 1.03 | 1.03 | 2.36 | 2.53 | 3.34 |
| $I_{t\,a.a}$ | 2.34 | 1.44 | 1.72 | 1.41 | — | 1.68 | 1.73 | 1.67 | 1.07 | 1.8 | 3.36 | 1.61 |

| MIXTURE | 13 | 14 | 15 | 16 | 17 | 18 | 19 | 20 | 21 | 22 | 23 | 24 |
|---|---|---|---|---|---|---|---|---|---|---|---|---|
| MOR | 22.9 / 38.7 | 16.65 | 20.06 | 29.63 | 26.92 | 26.5 | 22.72 | 22.73 | 24.67 | 27.08 | 19.41 | 13.6 |
| $\Sigma_r$ | 1.6 / 2.04 | 0.67 | 0.79 | 1.16 | 2.07 | 2.31 | 1.79 | 2.48 | 2.48 | 1.20 | 1.84 | 3.06 |
| LOP | 15.3 / 29.4 | 16.36 | 18.79 | 22.81 | 26.92 | 25.89 | 22.72 | 22.55 | 22.02 | 17.26 | 19.35 | 13.6 |
| $\Sigma_{LOP}$ | 0.79 / 1.31 | 0.65 | 0.63 | 1.07 | 2.07 | 2.20 | 1.79 | 2.38 | 2.01 | 0.58 | 1.80 | 3.06 |
| d | 2.23 / 2.11 | 2.05 | 2.19 | 2.08 | 2.21 | 2.16 | 2.23 | 2.23 | 2.23 | 2.25 | 1.83 | 1.86 |
| E | 19.64 / 22.78 | 24.67 | 29.7 | 25.8 | 12.81 | 11.50 | 12.45 | 9.49 | 10.74 | 30.37 | 10.43 | 4.78 |
| $W_r$ | 176 / 356 | 44 | 69 | 138 | 217 | 245 | 159 | 219 | 259 | 153 | 139 | 165 |
| $W_e$ | 48 / 150 | 41 | 47 | 119 | 217 | 222 | 159 | 213 | 177 | 39 | 137 | 165 |
| $MOR_{a.a}$ | — | 21.65 | 22.21 | — | 13.69 | 14.49 | 19.24 | 14.92 | — | 18.79 | 20.44 | 16.50 |
| $\Sigma_{r\,a.a}$ | — | 0.79 | 1.04 | — | 1.92 | 2.18 | 2.01 | 2.01 | 2.07 | 0.86 | 1.9 | 2.82 |
| $LOP_{a.a}$ | — | 21.6 | 15.89 | — | 29.14 | 33.14 | 31.72 | 27.24 | 29.91 | 13.92 | 16.65 | 10.10 |
| $\Sigma_{LOP\,a.a}$ | — | 0.79 | 0.52 | — | 1.86 | 2.18 | 1.89 | 1.98 | 1.86 | 0.5 | 1.88 | 2.73 |
| $d_{a.a}$ | — | — | — | — | 2.22 | 2.12 | 2.23 | 2.21 | 2.18 | — | 1.91 | 2.01 |
| $E_{a.a}$ | — | 27.5 | 30.66 | — | 15.91 | 15.13 | 16.84 | 13.6 | 16.13 | 28 | 8.79 | 3.63 |
| $I_t$ | 3.74 / 2.36 | 1.08 | 1.35 | 1.13 | 1 | 1.09 | 1 | 1.05 | 1.51 | 4.15 | 1 | 1 |
| $I_{t\,a.a}$ | — | 1 | 3.5 | — | 1.08 | 1 | 1.15 | 1.03 | 1.25 | 2.79 | 1.05 | 1.07 |

| MIXTURE | 25 | 26 | 27 | 28 | 29 | 30 | 31 | 32 | 33 | 34 | 35 | 36 | 37 |
|---|---|---|---|---|---|---|---|---|---|---|---|---|---|
| MOR | 17.88 | 17.06 | 24.6 | 26.3 | 19.71 | 10.13 | 24.53 | 25.59 | 21.22 | 23.6 | 17.63 | 21.61 | 24.98 |
| $\Sigma_r$ | 2.39 | 1.44 | 2.6 | 3 | 2.3 | 1.54 | 2.73 | 2.38 | 2.40 | 2.23 | 2.32 | 2.77 | 2.32 |
| LOP | 17.84 | 16.90 | 24.4 | 24.27 | 18.13 | 10.13 | 18.4 | 21.28 | 20.76 | 20.54 | 17.5 | 18.83 | 21.57 |
| $\Sigma_{LOP}$ | 2.36 | 1.35 | 2.48 | 2.4 | 1.89 | 1.54 | 1.81 | 1.73 | 2.21 | 1.61 | 2.29 | 2.12 | 1.86 |
| d | 2.09 | 2.04 | 1.97 | 1.94 | 2.06 | 2.06 | 2.21 | 2.21 | 2.06 | 2.16 | 1.99 | 2.21 | 2.26 |
| E | 7.63 | 12.39 | 9.86 | 9.8 | 9.48 | 6.58 | 10.11 | 12.41 | 9.42 | 12.85 | 7.5 | 9.22 | 11.37 |
| $W_r$ | 177 | 105 | 257 | 338 | 199 | 63 | 279 | 266 | 221 | 246 | 162 | 269 | 246 |
| $W_e$ | 168 | 90 | 235 | 226 | 136 | 62 | 143 | 146 | 184 | 130 | 157 | 129 | 161 |
| $MOR_{a.a}$ | 20.33 | 18.79 | — | — | 30.41 | 10.01 | 16.84 | 27.43 | 23.34 | 22.52 | — | 23.65 | 30.05 |
| $\Sigma_{r\,a.a}$ | 2.18 | 2.07 | — | — | 2.09 | 1.47 | 1.86 | 1.75 | 1.77 | 1.56 | — | 1.78 | 1.74 |
| $LOP_{a.a}$ | 19.60 | 17.84 | — | — | 29.52 | 10.01 | 14.37 | 27.35 | 21.49 | 22.12 | — | 23.15 | 29.68 |
| $\Sigma_{LOP\,a.a}$ | 2.05 | 1.86 | — | — | 1.94 | 1.47 | 1.48 | 1.73 | 1.55 | 1.48 | — | 1.67 | 1.70 |

TABLE IV-continued

| | | | | | | | | | | | | | |
|---|---|---|---|---|---|---|---|---|---|---|---|---|---|
| $d_{a.a}$ | 2.03 | 2.12 | — | — | 2.23 | 2.16 | 2.21 | 2.20 | 2.05 | 2.18 | — | 2.26 | 2.18 |
| $E_{a.a}$ | 9.54 | 9.38 | — | — | 15.27 | 7.16 | 9.74 | 15.9 | 13.49 | 15.04 | 1.05 | 14 | 17.13 |
| $I_t$ | 1.04 | 1.14 | 1.11 | 1.5 | 1.43 | 1.02 | 3.64 | 1.88 | 1.17 | 1.89 | — | 2.02 | 1.57 |
| $I_{t\,a.a}$ | 1.17 | 1.25 | — | — | 1.18 | 1 | 1.70 | 1.04 | 1.27 | 1.09 | — | 1.16 | 1.03 |
| MIXTURE | 38 | 39 | 40 | 41 | 42 | 43 | 44 | 45 | 46 | 47 | 48 | 49 | 50 |
| MOR | 34.35 | 11.56 | 19.87 | 30.27 | 34.66 | 29.7 | 14.41 | 19.28 | 18.98 | 34.6 | 47.36 | 19.63 | 25.47 |
| $\Sigma_r$ | 2.83 | 1.35 | 1.46 | 2.16 | 2.39 | 2 | 2.1 | 2.18 | 2.25 | 8 | 8.10 | 1.92 | 2.73 |
| LOP | 30.70 | 11.56 | 18.97 | 30.27 | 34.60 | 29.62 | 13.19 | 16.14 | 18.01 | 15.1 | 18.67 | 19.03 | 20.69 |
| $\Sigma_{LOP}$ | 2.35 | 1.35 | 1.34 | 2.16 | 2.39 | 2 | 1.67 | 1.36 | 2.03 | 0.73 | 0.91 | 1.77 | 1.99 |
| d | 2.30 | 2.24 | 2.21 | 2.17 | 2.18 | 2.05 | 2.01 | 2.03 | 1.97 | 2.06 | 2.01 | 1.88 | 1.97 |
| E | 13.3 | 8.47 | 14.49 | 13.96 | 14.23 | 14.3 | 8.38 | 12.42 | 10.18 | 20.45 | 20.63 | 10.59 | 10.27 |
| $W_r$ | 427 | 63 | 120 | 265 | 325 | 236 | 135 | 197 | 188 | 1632 | 2212 | 155 | 291 |
| $W_e$ | 279 | 63 | 96 | 265 | 325 | 234 | 87 | 87 | 142 | 43 | 67 | 134 | 161 |
| $MOR_{a.a}$ | 41.98 | 20.22 | 25.09 | 28.83 | 28.20 | 23.55 | 23.57 | 19.49 | 23.39 | 37.93 | 38.05 | 19.22 | 17.43 |
| $\Sigma_{r\,a.a}$ | 2.34 | 1.45 | 1.39 | 1.87 | 1.93 | 1.92 | 3.09 | 2.34 | 2.94 | 4.25 | 6.16 | 2.03 | 2.02 |
| $LOP_{a.a}$ | 39.28 | 20.22 | 25.09 | 28.83 | 25.06 | 23.55 | 23.29 | 17.15 | 19.69 | 21.13 | 14.00 | 19.22 | 17.09 |
| $\Sigma_{LOP\,a.a}$ | 2.12 | 1.45 | 1.39 | 1.87 | 1.66 | 1.88 | 3.00 | 1.91 | 2.24 | 0.88 | 0.73 | 2.03 | 1.91 |
| $d_{a.a}$ | 2.16 | 2.24 | 2.17 | 2.22 | 2.23 | 2.21 | 2.10 | 2.18 | 2.07 | 2.18 | — | 2.01 | 2.16 |
| $E_{a.a}$ | 17.87 | 13.8 | 17.96 | 15.17 | 14.89 | 12.01 | 7.88 | 8.96 | 8.71 | 24.71 | 20.53 | 9.21 | 8.88 |
| $I_t$ | 1.52 | 1 | 1.29 | 1 | 1 | 1.01 | 1.67 | 2.35 | 1.34 | 38.72 | 34.96 | 1.17 | 1.86 |
| $I_{t\,a.a}$ | 1.19 | 1 | 1 | 1 | 1.39 | 1.05 | 1.25 | 1.61 | 1.90 | 16.28 | 41.07 | 1 | 1.1 |
| MIXTURE | 51 | 52 | 53 | 54 | 55 | 56 | 57 | 58 | 59 | 60 | 61 | 62 | 63 |
| MOR | 21.28 | 22.29 | 13.19 | 9.6 | 25.01 | 24.35 | 21.43 | 25.01 | 29.59 | 28.99 | 30.85 | 23.89 | 21.28 |
| $\Sigma_r$ | 2.45 | 2.4 | 1.58 | 1.51 | 1.00 | 1.13 | 0.91 | 1.00 | 1.06 | 1.09 | 1.64 | 0.94 | 1.15 |
| LOP | 17.93 | 20.10 | 13.08 | 8.99 | 25.01 | 23.07 | 21.43 | 25.01 | 28.85 | 28.48 | 29.79 | 23.89 | 19.92 |
| $\Sigma_{LOP}$ | 1.88 | 2.10 | 1.55 | 1.38 | 1.00 | 0.96 | 0.91 | 1.00 | 1.02 | 1.05 | 1.13 | 0.94 | 1.03 |
| d | 1.98 | 2.14 | 2.15 | 2.15 | 1.97 | 1.96 | 1.90 | 1.97 | 2.04 | 2.11 | 2.03 | 2.11 | 1.96 |
| E | 9.66 | 10.22 | 8.17 | 6.54 | 25.05 | 24.03 | 23.48 | 25.05 | 28.17 | 26.97 | 26.42 | 25.21 | 19.33 |
| $W_r$ | 222 | 242 | 81 | 59 | 97 | 117 | 76 | 97 | 124 | 126 | 157 | 86 | 100 |
| $W_e$ | 132 | 162 | 79 | 49 | 97 | 86 | 76 | 97 | 114 | 117 | 131 | 86 | 80 |
| $MOR_{a.a}$ | 20.76 | 17.26 | 23.60 | 15.61 | — | 23.16 | 26.26 | — | — | — | — | — | — |
| $\Sigma_{r\,a.a}$ | 1.98 | 1.68 | 2.25 | 2.39 | — | 0.93 | 1.17 | — | — | — | — | — | — |
| $LOP_{a.a}$ | 20.76 | 17.10 | 23.6 | 15.61 | — | 23.16 | 26.26 | — | — | — | — | — | — |
| $\Sigma_{LOP\,a.a}$ | 1.98 | 1.64 | 2.25 | 2.39 | — | 0.93 | 1.17 | — | — | — | — | — | — |
| $d_{a.a}$ | 2.17 | 2.22 | 2.13 | 2.12 | — | 2.11 | 1.93 | — | — | — | — | — | — |
| $E_{a.a}$ | 10.32 | 10.37 | 10.20 | 6.44 | — | 23.06 | 10.37 | — | — | — | — | — | — |
| $I_t$ | 1.84 | 1.44 | 1.02 | 1.24 | 1 | 1.4 | 1 | 1 | 1.08 | 1.10 | 1.19 | 1 | 1.29 |
| $I_{t\,a.a}$ | 1 | 1.05 | 1 | 1 | — | 1.03 | 1 | 1 | — | — | — | — | — |

We claim:

1. Process for manufacturing a cement base mixture comprising the steps of
    (a) forming a paste having interstices by mixing a granular cement with a granular pulverized mineral material for filling interstices, water and at least one additive; and
    (b) mixing the paste with reinforcing fibers; wherein
        (1) the granular pulverized mineral material has an average grain diameter of 3 to 20 μm, which diameter is 1/5 to 1/10 of the average grain diameter of the granular cement;
        (2) the additive is selected from the group consisting of liquifiers, water reducers and dispersants;
        (3) the following quantities of components, per 100 parts by weight of cement, are mixed to form said paste:
            (i) approximately 5 to 20 parts of the granular pulverized mineral material;
            (ii) approximately 20 to 35 parts of water; and
            (iii) greater than 0 and up to approximately 4 parts by weight of the additive; and
        (4) approximately 2 to 18 parts of reinforcing fibers, per 100 parts by weight of cement, are mixed with the paste.

2. Process according to claim 1 wherein step (a) further comprises mixing an additional granular pulverized mineral material for filling interstices wherein:
    the additional granular pulverized mineral material has an average grain diameter which is between 1/5 and 1/10 of the average diameter of the grains of said granular pulverized mineral material; and greater than 0 and up to approximately 5 parts by weight of the additional granular pulverized mineral material, per 100 parts by weight of cement, are mixed.

3. Process according to claim 2 wherein the paste is formed by mixing, per 100 parts by weight of cement between approximately 23 parts and 30 parts by weight of water.

4. Process according to claim 2 wherein step (a) further comprises mixing plasticizer in an amount greater than 0 and up to approximately 1 part by weight per 100 parts by weight of cement.

5. Process according to claim 2 wherein said granular pulverized mineral material is a kaolin clay.

6. Process according to claim 2 wherein said granular pulverized mineral material is metakaolin clay.

7. Process according to claim 2 wherein cement and the pulverized materials are mixed before adding the water.

8. Process according to claim 2 wherein the reinforcing fibers comprise first fibers and second fibers; said first fibers having an average diameter between approximately 10 and 30 μm and said second fibers having an average diameter between approximately 3 and 5 μm.

9. Process according to claim 2 wherein the reinforcing fibers have an average diameter of between approximately 3 μm and 30 μm.

10. Process according to claim 2 wherein the reinforcing fibers comprise mineral wool.

11. Process according to claim 2 wherein between approximately 2 parts and 3 parts of said additive are mixed per 100 parts by weight of cement.

12. Cement base product formed from a cement base mixture made in accordance with claim 2.

13. Cement base product according to claim 12 wherein the granular pulverized mineral material is selected from the group consisting of clays, chalks, dolomites, hollow mineral micro spheres and Wollastonite powders; and
    wherein the additional granular pulverized mineral material is selected from the group consisting of microsilica, graphite and microfibers of crushed glass.

14. Cement base product according to claim 13 wherein the cement is chosen from the group consisting of CPA artificial Portland cement, pozzolanic-sulphate cement, aluminous cement, CPJ Portland cement containing up to about 35% slag, pozzolan, or cinders and white cement containing minimal amounts of metal oxides; and
    the reinforcing fibers are chosen from the group consisting of mineral fibers, glass fibers, asbestos fibers, steel fibers, cast iron fibers, cellulose fibers, synthetic fibers, natural jute fibers, bamboo fibers and polymer fibers.

15. Cement base product according to claim 12 wherein the reinforcing fibers comprise first fibers and second fibers said first fibers having an average diameter between approximately 10 and 30 $\mu$m and said second fibers having an average diameter between approximately 3 and 5 $\mu$m.

16. Process according to claim 1 wherein, per 100 parts by weight of cement, between approximately 2 parts and 3 parts of said additive are mixed.

17. Process according to claim 1 wherein the paste is formed by mixing, per 100 parts by weight of cement, between approximately 23 parts and 30 parts by weight of water.

18. Process according to claim 1 further comprising the paste being formed by adding, per 100 parts by weight of cement, greater than 0 up to approximately 1 part by weight of plasticizer.

19. Process according to claim 1 wherein the granular pulverized mineral material is a kaolin clay.

20. Process according to claim 1 wherein the pulverized material is metakaolin clay.

21. Process according to claim 1 wherein the cement and the pulverized material are mixed before adding the water.

22. Process according to claim 1 wherein the reinforcing fibers comprise first fibers and second fibers; said first fibers having an average diameter between approximately 10 and 30 $\mu$m and said second fibers having an average diameter between approximately 3 and 5 $\mu$m.

23. Process according to claim 1 wherein the reinforcing fibers have an average diameter of between approximately 3 $\mu$m and 30 $\mu$m.

24. Process according to claim 1 wherein the reinforcing fibers comprise mineral wool.

25. Cement base product formed from a cement base mixture made in accordance with claim 1.

26. Cement base product according to claim 25 wherein the paste is formed by mixing, per 100 parts by weight of cement, between approximately 23 and 30 parts by weight of water.

27. Cement base product according to claim 25 wherein the granular pulverized mineral material is selected from the group consisting of clays, chalks, dolomites, hollow mineral microspheres and Wollastonite powders.

28. Cement base product according to claim 27 wherein the cement is chosen from the group consisting of CPA artificial Portland cement, pozzolanic-sulphate cement, aluminous cement, CPJ Portland cement containing up to about 35% slag, pozzolan or cinders, and white cement having minimal amounts of metal oxides; and
    wherein the reinforcing fibers are chosen from the group consisting of mineral fibers, glass fibers, asbestos fibers, steel fibers, cast iron fibers, cellulose fibers, synthetic fibers, natural jute fibers, bamboo fibers and polymer fibers.

29. Cement base product according to claim 28, wherein the reinforcing fibers comprise first fibers and second fibers; said first fibers having an average diameter between approximately 10 and 30 $\mu$m and said second fibers having an average diameter between approximately 3 and 5 $\mu$m.

30. Cement base product having interstices comprising granular cement, a granular pulverized mineral material for filling interstices, water, at least one additive and reinforcing fibers wherein:
    (a) the granular pulverized mineral material has an average grain diameter of about 3 to 20 $\mu$m, which diameter is 1/5 to 1/10 of the average grain diameter of the granular cement;
    (b) the additive is selected from the group consisting of liquifiers, water reducers and dispersants;
    (c) the following quantities of components, per 100 parts by weight of cement, are included:
        (i) approximately 5 to 20 parts of the granular pulverized mineral material;
        (ii) approximately 20 to 35 parts of water; and
        (iii) greater than 0 and up to approximately 4 parts by weight of the additive; and
        (iv) approximately 2 to 18 parts of reinforcing fibers.

31. Cement base product according to claim 30 further comprising an additional granular pulverized mineral material for filling interstices wherein:
    (a) the average grain diameter of the additional granular pulverized mineral material is about 1/5 to 1/10 of the average diameter of the grains of said granular pulverized mineral material; and
    (b) greater than 0 and up to approximately 5 parts by weight of the additional granular pulverized mineral material, per 100 parts by weight of cement, are included.

32. Cement base product according to claim 31 wherein the reinforcing fibers comprise first fibers and second fibers; said first fibers having an average diameter between approximately 10 and 30 $\mu$m and said second fibers having an average diameter between approximately 3 and 5 $\mu$m.

33. Process for manufacturing a cement base mixture comprising the steps of
    (a) forming a paste having interstices by mixing a granular cement with a granular pulverized mineral material for filling interstices, water and at least one additive; and
    (b) mixing the paste with reinforcing fibers; wherein
        (1) the granular pulverized mineral filler material has an average grain diameter of 3 to 20 $\mu$m, which diameter is 1/5 to 1/10 of the average grain diameter of the granular cement;

(2) the granular pulverized mineral material is selected from the group consisting of clays, chalks, dolomites, hollow mineral microspheres and Wollastonite powders;

(3) the additive is selected from the group consisting of liquifiers, water reducers and dispersants;

(4) the following quantities of components, per 100 parts by weight of cement, are mixed to form said paste;

(i) approximately 5 to 20 parts of the granular pulverized mineral material;

(ii) approximately 20 to 35 parts of water; and (iii) greater than 0 and up to approximately 4 parts by weight of the additive; and (5) approximately 2 to 18 parts of reinforcing fibers, per 100 parts by weight of cement, are mixed with the paste.

34. Process according to claim 33 wherein step (a) further comprises mixing an additional granular pulverized mineral material for filling interstices wherein:

the additional granular pulverized mineral material has an average grain diameter which is between 1/5 and 1/10 of the average diameter of the grains of said granular pulverized mineral material;

greater than 0 and up to approximately 5 parts by weight of the additional granular pulverized mineral material, per 100 parts by weight of cement, are mixed; and the additional granular pulverized mineral material is selected from the group consisting of microsilica, graphite and microfibers of crushed glass.

35. Process according to claim 33 wherein the cement is chosen from the group consisting of CPA artificial Portland cement, pozzolanic-sulphate cement, aluminous cement, CPJ Portland cement containing up to about 35% slag, pozzolan or cinders, and white cement having minimal amounts of metal oxides; and the reinforcing fibers are chosen from the group consisting of mineral fibers, glass fibers, asbestos fibers, steel fibers, cast iron fibers, cellulose fibers, synthetic fibers, natural jute fibers, bamboo fibers and polymer fibers.

* * * * *